(12) United States Patent
Aborshaid et al.

(10) Patent No.: US 11,680,480 B2
(45) Date of Patent: Jun. 20, 2023

(54) MULTI-LAYER GAS RESERVOIR FIELD DEVELOPMENT SYSTEM AND METHOD

(71) Applicant: Saudi Arabian Oil Company, Dhahran (SA)

(72) Inventors: Hussain Aborshaid, Dhahran (SA); Adel Al-Qahtani, Khobar (SA)

(73) Assignee: Saudi Arabian Oil Company, Dhahran (SA)

(*) Notice: Subject to any disclaimer, the term of this patent is extended or adjusted under 35 U.S.C. 154(b) by 59 days.

(21) Appl. No.: 17/329,388

(22) Filed: May 25, 2021

(65) Prior Publication Data

US 2022/0381135 A1 Dec. 1, 2022

(51) Int. Cl.
*E21B 47/04* (2012.01)
*E21B 43/27* (2006.01)
(Continued)

(52) U.S. Cl.
CPC ............ *E21B 47/04* (2013.01); *E21B 43/267* (2013.01); *E21B 43/27* (2020.05); *G01V 99/005* (2013.01); *E21B 47/00* (2013.01); *E21B 49/087* (2013.01)

(58) Field of Classification Search
CPC ........ E21B 47/04; E21B 43/267; E21B 43/27; E21B 49/087; E21B 47/00; G01V 99/005
See application file for complete search history.

(56) References Cited

U.S. PATENT DOCUMENTS 7,689,397 B2 3/2010 Ghorayeb et al.
7,953,585 B2 5/2011 Gurinpar et al.
(Continued)

FOREIGN PATENT DOCUMENTS

CN 111101924 A 5/2020
CN 111287726 A 6/2020
(Continued)

OTHER PUBLICATIONS

PetroWiki (Well Stimulation, PetroWiki, Jun. 20, 2017, https://petrowiki.spe.org/Well_stimulation?_ga=2.248471687.162835280.1662639577-1307888807.1662639577) (Year: 2017).*

(Continued)

*Primary Examiner* — Daniel R Miller
*Assistant Examiner* — Christian T Bryant
(74) *Attorney, Agent, or Firm* — Bracewell LLP; Constance G. Rhebergen; Brian H. Tompkins

(57) ABSTRACT

Provided are embodiments for hydrocarbon reservoir development that include the following: identifying proposed well locations within a reservoir boundary, for each location, developing a well plan by: (a) identifying layers of the reservoir located below the proposed location; (b) iteratively assessing the layers (from deepest to shallowest) to identify a deepest "suitable" layer that is not dry, congested, or unsuitable for gas production; and (c) performing the following for the identified layer and the location: (i) determining a borehole configuration for the location; (ii) determining a completion type for the location; and (iii) determining a stimulation treatment for the location, where a well plan for the location (e.g., for use in developing the reservoir) is generated that specifies some or all of a well location, the target layer, a borehole configuration, a completion type, and a stimulation treatment that corresponds to those determined for the proposed well location.

13 Claims, 6 Drawing Sheets

(51) Int. Cl.
  *E21B 43/267* (2006.01)
  *E21B 47/00* (2012.01)
  *G01V 99/00* (2009.01)
  *E21B 49/08* (2006.01)

(56) References Cited

U.S. PATENT DOCUMENTS

| | | | |
|---|---|---|---|
| 7,966,166 | B2 | 6/2011 | Thambynayagam et al. |
| 8,812,334 | B2 | 8/2014 | Givens et al. |
| 9,091,141 | B2 | 7/2015 | Abasov et al. |
| 9,810,052 | B2 | 11/2017 | Alqahtahi et al. |
| 10,060,227 | B2 | 8/2018 | Khan et al. |
| 10,233,749 | B2 | 3/2019 | Anisur Rahman et al. |
| 10,311,173 | B2 | 6/2019 | Havre et al. |
| 10,895,131 | B2 | 1/2021 | Mustapha |
| 10,914,158 | B2 | 2/2021 | Otaibi et al. |
| 2010/0191516 | A1 | 7/2010 | Benish et al. |
| 2013/0317798 | A1 | 11/2013 | Cheng et al. |
| 2016/0003008 | A1 | 1/2016 | Uribe et al. |
| 2016/0376885 | A1 | 12/2016 | Li et al. |
| 2018/0003007 | A1 | 1/2018 | Wang |
| 2018/0284311 | A1 | 10/2018 | Echeverria Ciaurri et al. |
| 2018/0320512 | A1* | 11/2018 | Anisur Rahman . E21B 41/0092 |

FOREIGN PATENT DOCUMENTS

| | | |
|---|---|---|
| CN | 111648751 A | 9/2020 |
| GB | 2398900 A | 9/2004 |
| WO | 2012027020 A1 | 3/2012 |
| WO | 2019232043 A1 | 12/2019 |

OTHER PUBLICATIONS

PetroWiki (Matrix Acidizing, PetroWiki, Jul. 1, 2015, https://petrowiki.spe.org/Matrix_acidizing) (Year: 2015).*

PetroWiki (Fracture treatment design, PetroWiki, Jan. 15, 2018, https://petrowiki.spe.org/Fracture_treatment_design) (Year: 2018).*

PetroWiki (Hydraulic fracturing, PetroWiki, Feb. 26, 2021, https://petrowiki.spe.org/Hydraulic_fracturing) (Year: 2021).*

Wikipedia (Completion (oil and gas wells), Wikipedia, Wayback Machine, Apr. 10, 2021, https://web.archive.org/web/20210410140732/https://en.wikipedia.org/wiki/Completion_(oil_and_gas_wells)) (Year: 2021).*

Wikipedia (Well stimulation, Wikipedia, Wayback Machine, Oct. 31, 2020, https://web.archive.org/web/20201031061004/https://en.wikipedia.org/wiki/Well_stimulation) (Year: 2020).*

Alyaev, Sergey et al.; "A Decision Support System for Multi-target Geosteering" arXiv1903.03933v2 [cs.CE] Sep. 20, 2019; pp. 1-44.

Cakici, Mahmut Deniz et al.; "Well, Reservoir and Facilities Management (WRFM) and Surveillance Planning in a Multi-Stacked Mature Oil and Gas Field in Baram Delta" SPE-174638-MS, SPE Enhanced Oil Recovery Process, Malaysia, Aug. 11-13, 2015; pp. 1-10.

Kayode, Oluwadairo; "Multilateral Well Modeling From Compailmentalized Reservoirs" Faculty of Engineering and Applied Science, Memorial University of Newfoundland, May 2018; pp. 1-126.

Osunrinde, Taiwo Oludele et al.; "Field developmental plan analysis: a case study of 'x' reservoir" Journal of Petroleum Exploration and Production Technology; Mar. 1, 2019; pp. 1-19.

Petrowiki; "Acid fracturing" available as of Mar. 31, 2021 at: https://petrowiki.spe.org/Acid_fracturing; pp. 1-5.

Petrowiki; "Directional well profile: overburden section" available as of Mar. 31, 2021 at: https://petrowiki.org/Directional_well_profile:_overburden_section#S-shaped_well; pp. 1-3.

Petrowiki; "Matrix acidizing" available as of Mar. 31, 2021 at: https://petrowiki.spe.org/Matrix_acidizing; pp. 1-5.

Seale, Rocky; "Open-hole completion system enables multi-stage fracturing and stimulation along horizontal wellbores" Drilling Contractor, Fracturing & Stimulation, Jul./Aug. 2007; pp. 112-114.

Wikipedia; "Completion (oil and gas wells)" available as of Mar. 31, 2021 at: https://en.wikipedia.org/wiki/Completion_oil_and_gas_wells); pp. 1-9.

Wikipedia; "Hydraulic fracturing proppants" available as of Mar. 31, 2021 at: https://en.wikipedia.org/wiki/Hydraulic_fracturing_proppants; pp. 1-4.

* cited by examiner

MULTI-LAYER GAS RESERVOIR FIELD DEVELOPMENT SYSTEM AND METHOD

FIELD

Embodiments relate generally to developing hydrocarbon reservoirs, and more particularly to multi-layer gas reservoir field development.

BACKGROUND

A rock formation residing under the Earth's surface is often referred to as a "subsurface" formation. A subsurface formation that contains a subsurface pool of hydrocarbons, such as oil or gas, is often referred to as a "hydrocarbon reservoir." Hydrocarbons are typically extracted (or "produced") from a hydrocarbon reservoir by way of a hydrocarbon well. A hydrocarbon well normally includes a wellbore (or "borehole") that is drilled into the reservoir. For example, a hydrocarbon well may include a wellbore that extends into the rock of a reservoir to facilitate the extraction (or "production") of hydrocarbons from the reservoir, the injection of fluids into the reservoir, or the evaluation and monitoring of the reservoir.

Development of a hydrocarbon reservoir typically involves operations directed to optimizing extraction of the hydrocarbons from the reservoir. For example, a reservoir operator may spend a great deal of time and effort assessing a hydrocarbon reservoir to identify and execute economical and environmentally responsible plan to extract hydrocarbons from the reservoir. This can include identifying where hydrocarbons are located in the reservoir, generating a field development plan (FDP) that outlines procedures for locating, drilling and operating wells to extract hydrocarbons from the reservoir, and drilling and operating multiple wells in accordance with the FDP. An FDP for a hydrocarbon reservoir may, for example, specify locations, characteristics and operational parameters of wells that extend into the reservoir.

SUMMARY

Reservoir and well development planning can be a critical aspect of successfully developing a hydrocarbon reservoir. For example, in the context of a gas reservoir, a "gas" field development plan (FDP) may specify gas well locations, target layers, borehole configurations, completion types/ratings and stimulation treatments. A FDP may be used as a basis for drilling, completing and producing multiple gas wells in a manner to effectively and efficiently extract gas from the reservoir. Unfortunately, it can be difficult to determine how best to locate, drill, complete and operate a single well, and these types of determinations can become increasing more difficult for complex reservoirs. In the case of multiple wells being distributed across a complex reservoir, such as multiple reservoir layers having varying characteristics, an effective FDP may need to take into account characteristics of individual wells, as well as the proximity and interactions of wells. Besides, lending itself to ineffective extraction of hydrocarbons, the inability to determine an effective well and field development strategies for a reservoir can lead to logistical uncertainties that can, in turn, lead to inefficiencies, delays and relatively high development costs.

Provided are systems and methods for hydrocarbon reservoir development, including gas field planning and development. In some embodiments, proposed well locations for a multi-layer gas reservoir are identified and assessed to generate a corresponding gas field development plan that can be used as a basis for developing the multi-layer gas reservoir. For example, embodiments may include the following: (1) identifying proposed well locations located within a reservoir boundary; and (2) for each proposed well location, developing a well plan according to the following: (a) identifying layers of the multi-layer gas reservoir that are located below the proposed well location; (b) iteratively assessing the layers from deepest to shallowest to identify a deepest "suitable" layer that is not dry, congested, or unsuitable for gas production (a "target layer"); and (c) performing the following for the target layer and the proposed well location: (i) determining a borehole configuration for the proposed well location (e.g., based on reservoir pressure, reservoir quality and borehole spacing requirements associated with the proposed well location, and the borehole configuration determined being a horizontal wellbore configuration, a deviated wellbore configuration, or a vertical wellbore configuration); (ii) determining a completion type for the proposed well location (e.g., based on the borehole configuration for the proposed well location, a formation breakdown pressure associated with the proposed well location and type of rock associated with the proposed well location, and the completion type determined being a high-pressure lined completion, a low pressure lined completion, a high-pressure open-holed completion, or a low-pressure open-holed completion); (ii) determining a stimulation treatment for the proposed well location (e.g., based on the borehole configuration and the completion type for the proposed well location, and the stimulation treatment determined being a proppant fracture stimulation treatment, an acid/matrix stimulation treatment, or an acid/fracture stimulation treatment), where a well plan for the proposed well location is generated that specifies some or all of a well location, the target layer, a borehole configuration, a completion type, and a stimulation treatment that corresponds to the respective ones determined for the proposed well location. In some embodiments, a gas field development plan is determined based on well plans for the proposed well locations. A gas field development plan may, for example, specify, for each of one or more proposed well locations, some or all of the well location, the target layer, the borehole configuration, the completion type, and the stimulation treatment specified by the gas well plan for the associated proposed well location. In some embodiments, the multi-layer gas reservoir is developed based on the gas field development plan. This may include, for example, forming (e.g., drilling or completing), for one or more of the proposed well locations, a gas well extending into the multi-layer gas reservoir, with each of the gas wells being formed in accordance with some or all of the well location, the target layer, the borehole configuration, the completion type, and the stimulation treatment specified by the field plan for the associated proposed well location.

Provided in some embodiments is a system for developing a multi-layer gas reservoir. The system including: a control system including a processor and non-transitory computer readable storage medium including program instructions stored thereon that are executable by the processor to perform the following operations: determining a reservoir boundary defining extents of a field of a multi-layer gas reservoir; identifying proposed well locations, each proposed well location of the proposed well locations being defined by a surface location located within the reservoir boundary; for each proposed well location of the proposed well locations, determining a well plan including the following: (a) identifying layers of the multi-layer gas reservoir that are located below the proposed well location; (b) identifying a deepest unassessed layer of the layers; (c) determining whether the deepest unassessed layer is a dry layer, a congested layer, or unsuitable for gas production; (d) in response to determining that the deepest unassessed layer is a dry layer, a congested layer, or unsuitable for gas production, returning to step (b) where a next shallowest layer of the layers is identified as the deepest unassessed layer; (e) in response to determining that the deepest unassessed layer is not a dry layer, a congested layer, or unsuitable for gas production, identifying the deepest unassessed layer as a target layer for the proposed well location and performing the following for the proposed well location: (i) determining a borehole configuration for the proposed well location based on reservoir pressure, reservoir quality, and borehole spacing requirements associated with the proposed well location, the borehole configuration determined including a horizontal wellbore configuration, a deviated wellbore configuration, or a vertical wellbore configuration; (ii) determining a completion for the proposed well location based on the borehole configuration for the proposed well location, a formation breakdown pressure associated with the proposed well location and type of rock associated with the proposed well location, the completion determined including a high-pressure lined completion, a low pressure lined completion, a high-pressure open-holed completion, or a low-pressure open-holed completion; (ii) determining a stimulation treatment for the proposed well location based on the borehole configuration and the completion for the proposed well location, the stimulation treatment determined including a proppant fracture stimulation treatment, an acid/matrix stimulation treatment, or an acid/fracture stimulation treatment, the well plan for the proposed well location including the borehole configuration, the completion, and the stimulation treatment determined for the proposed well location; determining, based on the well plans for the proposed well locations, a gas field development plan, the gas field development plan specifying, for each of one or more of the proposed well locations, a gas well plan for a proposed gas well at a well location that corresponds to the proposed well location, the gas well plan specifying the target layer, the borehole configuration, the completion, and the stimulation treatment determined for the associated proposed well location; and developing the multi-layer gas reservoir based on the gas field development plan.

In some embodiments, developing the multi-layer gas reservoir based on the gas field development plan includes: forming one or more gas wells in the multi-layer gas reservoir, where each of the gas wells formed is formed in accordance with a well location, a target layer, a borehole configuration, a completion, and a stimulation treatment specified by a corresponding well plan of the gas field development plan. In certain embodiments, determining a borehole configuration for a proposed well location includes: determining a horizontal wellbore configuration for the proposed well location in response to determining that a reservoir pressure associated with the proposed well location is not low and a reservoir quality associated with the proposed well location is poor; determining a deviated wellbore configuration for the proposed well location in response to determining that a reservoir pressure associated with the proposed well location is not low, a reservoir quality associated with the proposed well location is poor, and borehole spacing is violated by the proposed well location; or determining a vertical wellbore configuration for the proposed well location in response to determining that the reservoir pressure associated with the proposed well location is not low, the reservoir quality associated with the proposed well location is poor, and borehole spacing is not violated by the proposed well location. In some embodiments, determining a completion for a proposed well location includes: determining a high-pressure completion in response to determining that the formation breakdown pressure associated with the proposed well location is high; determining a low-pressure completion in response to determining that the formation breakdown pressure associated with the proposed well location is low; determining a lined completion in response to: determining a deviated or vertical wellbore configuration for the proposed well location; or determining a horizontal wellbore configuration for the proposed well location and determining that an unconsolidated rock type is associated with the proposed well location; or determining an open-holed completion in response to: determining a horizontal wellbore configuration for the proposed well location, and determining that an unconsolidated rock type is not associated with the proposed well location. In certain embodiments, determining a stimulation treatment for a proposed well location includes: determining a proppant fracture stimulation treatment in response to determining an open-holed completion for the proposed well location; determining a proppant fracture stimulation treatment in response to determining a lined completion for the proposed well location and determining that the proposed well location is associated with a clastic rock type; determining an acid/matrix stimulation treatment in response to determining a lined completion for the proposed well location, determining that the proposed well location is not associated with a clastic rock type, and determining that the proposed well location is associated with permeable rock or proximate a water zone; or determining an acid/fracture stimulation treatment in response to determining a lined completion for the proposed well location, determining that the proposed well location is not associated with a clastic rock type, and determining that the proposed well location is not associated with permeable rock or is proximate a water zone.

Provided in some embodiments is a method for developing a multi-layer gas reservoir. The method including: determining a reservoir boundary defining extents of a field of a multi-layer gas reservoir; identifying proposed well locations, each proposed well location of the proposed well locations being defined by a surface location located within the reservoir boundary; for each proposed well location of the proposed well locations, determining a well plan including the following: (a) identifying layers of the multi-layer gas reservoir that are located below the proposed well location; (b) identifying a deepest unassessed layer of the layers; (c) determining that the deepest unassessed layer is not a dry layer, a congested layer, or unsuitable for gas production; (d) in response to determining that the deepest unassessed layer is not a dry layer, a congested layer, or unsuitable for gas production, identifying the deepest unassessed layer as a target layer for the proposed well location and performing the following for the proposed well location: (i) determining a borehole configuration for the proposed well location based on reservoir pressure, reservoir quality, and borehole spacing requirements associated with the proposed well location, the borehole configuration determined including a horizontal wellbore configuration, a deviated wellbore configuration, or a vertical wellbore configuration; (ii) determining a completion for the proposed well location based on the borehole configuration for the proposed well location, a formation breakdown pressure associated with the proposed well location and type of rock associated with the proposed well location, the completion determined including a high-pressure lined completion, a low pressure lined completion, a high-pressure open-holed completion, or a low-pressure open-holed completion; (ii) determining a stimulation treatment for the proposed well location based on the borehole configuration and the completion for the proposed well location, the stimulation treatment determined including a proppant fracture stimulation treatment, an acid/matrix stimulation treatment, or an acid/fracture stimulation treatment, the well plan for the proposed well location including the borehole configuration, the completion, and the stimulation treatment determined for the proposed well location; determining, based on the well plans for the proposed well locations, a gas field development plan, the gas field development plan specifying, for each of one or more of the proposed well locations, a gas well plan for a proposed gas well at a well location that corresponds to the proposed well location, the gas well plan specifying the target layer, the borehole configuration, the completion, and the stimulation treatment determined for the associated proposed well location; and developing the multi-layer gas reservoir based on the gas field development plan.

In some embodiments, developing the multi-layer gas reservoir based on the gas field development plan includes: forming one or more gas wells in the multi-layer gas reservoir, where each of the gas wells formed is formed in accordance with a well location, a target layer, a borehole configuration, a completion, and a stimulation treatment specified by a corresponding well plan of the gas field development plan. In certain embodiments, determining a borehole configuration for a proposed well location includes: determining a horizontal wellbore configuration for the proposed well location in response to determining that a reservoir pressure associated with the proposed well location is not low and a reservoir quality associated with the proposed well location is poor; determining a deviated wellbore configuration for the proposed well location in response to determining that a reservoir pressure associated with the proposed well location is not low, a reservoir quality associated with the proposed well location is poor, and borehole spacing is violated by the proposed well location; or determining a vertical wellbore configuration for the proposed well location in response to determining that the reservoir pressure associated with the proposed well location is not low, the reservoir quality associated with the proposed well location is poor, and borehole spacing is not violated by the proposed well location. In some embodiments, determining a completion for a proposed well location includes: determining a high-pressure completion in response to determining that the formation breakdown pressure associated with the proposed well location is high; determining a low-pressure completion in response determining that the formation breakdown pressure associated with the proposed well location is low; determining a lined completion in response to: determining a deviated or vertical wellbore configuration for the proposed well location; or determining a horizontal wellbore configuration for the proposed well location and determining that an unconsolidated rock type is associated with the proposed well location; or determining an open-holed completion in response to: determining a horizontal wellbore configuration for the proposed well location, and determining that an unconsolidated rock is not associated with the proposed well location. In certain embodiments, determining a stimulation treatment for a proposed well location includes: determining a proppant fracture stimulation treatment in response to determining an open-holed completion for the proposed well location; determining a proppant fracture stimulation treatment in response to determining a lined completion for the proposed well location and determining that the proposed well location is associated with a clastic rock type; determining an acid/matrix stimulation treatment in response to determining a lined completion for the proposed well location, determining that the proposed well location is not associated with a clastic rock type, and determining that the proposed well location is associated with permeable rock or proximate a water zone; or determining an acid/fracture stimulation treatment in response to determining a lined completion for the proposed well location, determining that the proposed well location is not associated with a clastic rock type, and determining that the proposed well location is not associated with permeable rock or is proximate a water zone. In some embodiments, the method further includes: identifying a first deepest unassessed layer of the layers that is deeper than the deepest unassessed layer identified at step (b); determining that the first deepest unassessed layer is a dry layer, a congested layer, or unsuitable for gas production; where the deepest unassessed layer of the layers is identified at step (b) in response to determining that the first deepest unassessed layer is a dry layer, a congested layer, or unsuitable for gas production.

Provided in some embodiments is a non-transitory computer readable storage medium including program instructions stored thereon that are executable by a processor to perform the following operations for developing a multi-layer gas reservoir: determining a reservoir boundary defining extents of a field of a multi-layer gas reservoir; identifying proposed well locations, each proposed well location of the proposed well locations being defined by a surface location located within the reservoir boundary; for each proposed well location of the proposed well locations, determining a well plan including the following: (a) identifying layers of the multi-layer gas reservoir that are located below the proposed well location; (b) identifying a deepest unassessed layer of the layers; (c) determining whether the deepest unassessed layer is a dry layer, a congested layer, or unsuitable for gas production; (d) in response to determining that the deepest unassessed layer is a dry layer, a congested layer, or unsuitable for gas production, returning to step (b) where a next shallowest layer of the layers is identified as the deepest unassessed layer; (e) in response to determining that the deepest unassessed layer is not a dry layer, a congested layer, or unsuitable for gas production, identifying the deepest unassessed layer as a target layer for the proposed well location and performing the following for the proposed well location: (i) determining a borehole configuration for the proposed well location based on reservoir pressure, reservoir quality, and borehole spacing requirements associated with the proposed well location, the borehole configuration determined including a horizontal wellbore configuration, a deviated wellbore configuration, or a vertical wellbore configuration; (ii) determining a completion for the proposed well location based on the borehole configuration for the proposed well location, a formation breakdown pressure associated with the proposed well location and type of rock associated with the proposed well location, the completion determined including a high-pressure lined completion, a low pressure lined completion, a high-pressure open-holed completion, or a low-pressure open-holed completion; (ii) determining a stimulation treatment for the proposed well location based on the borehole configuration and the completion for the proposed well location, the stimulation treatment determined including a proppant fracture stimulation treatment, an acid/matrix stimulation treatment, or an acid/fracture stimulation treatment, the well plan for the proposed well location including the borehole configuration, the completion, and the stimulation treatment determined for the proposed well location; determining, based on the well plans for the proposed well locations, a gas field development plan, the gas field development plan specifying, for each of one or more of the proposed well locations, a gas well plan for a proposed gas well at a well location that corresponds to the proposed well location, the gas well plan specifying the target layer, the borehole configuration, the completion, and the stimulation treatment determined for the associated proposed well location; and developing the multi-layer gas reservoir based on the gas field development plan. In some embodiments, developing the multi-layer gas reservoir based on the gas field development plan includes: controlling forming one or more gas wells in the multi-layer gas reservoir, where each of the gas wells formed is formed in accordance with a well location, a target layer, a borehole configuration, a completion, and a stimulation treatment specified by a corresponding well plan of the gas field development plan. In certain embodiments, determining a borehole configuration for a proposed well location includes: determining a horizontal wellbore configuration for the proposed well location in response to determining that a reservoir pressure associated with the proposed well location is not low and a reservoir quality associated with the proposed well location is poor; determining a deviated wellbore configuration for the proposed well location in response to determining that a reservoir pressure associated with the proposed well location is not low, a reservoir quality associated with the proposed well location is poor, and borehole spacing is violated by the proposed well location; or determining a vertical wellbore configuration for the proposed well location in response to determining that the reservoir pressure associated with the proposed well location is not low, the reservoir quality associated with the proposed well location is poor, and borehole spacing is not violated by the proposed well location. In some embodiments, determining a completion for a proposed well location includes: determining a high-pressure completion in response to determining that the formation breakdown pressure associated with the proposed well location is high; determining a low-pressure completion in response to determining that the formation breakdown pressure associated with the proposed well location is low; determining a lined completion in response to: determining a deviated or vertical wellbore configuration for the proposed well location; or determining a horizontal wellbore configuration for the proposed well location and determining that an unconsolidated rock type is associated with the proposed well location; or determining an open-holed completion in response to: determining a horizontal wellbore configuration for the proposed well location, and determining that an unconsolidated rock type is not associated with the proposed well location. In certain embodiments, determining a stimulation treatment for a proposed well location includes: determining a proppant fracture stimulation treatment in response to determining an open-holed completion for the proposed well location; determining a proppant fracture stimulation treatment in response to determining a lined completion for the proposed well location and determining that the proposed well location is associated with a clastic rock type; determining an acid/matrix stimulation treatment in response to determining a lined completion for the proposed well location, determining that the proposed well location is not associated with a clastic rock type, and determining that the proposed well location is associated with permeable rock or proximate a water zone; or determining an acid/fracture stimulation treatment in response to determining a lined completion for the proposed well location, determining that the proposed well location is not associated with a clastic rock type, and determining that the proposed well location is not associated with permeable rock or is proximate a water zone.

Figure 1:
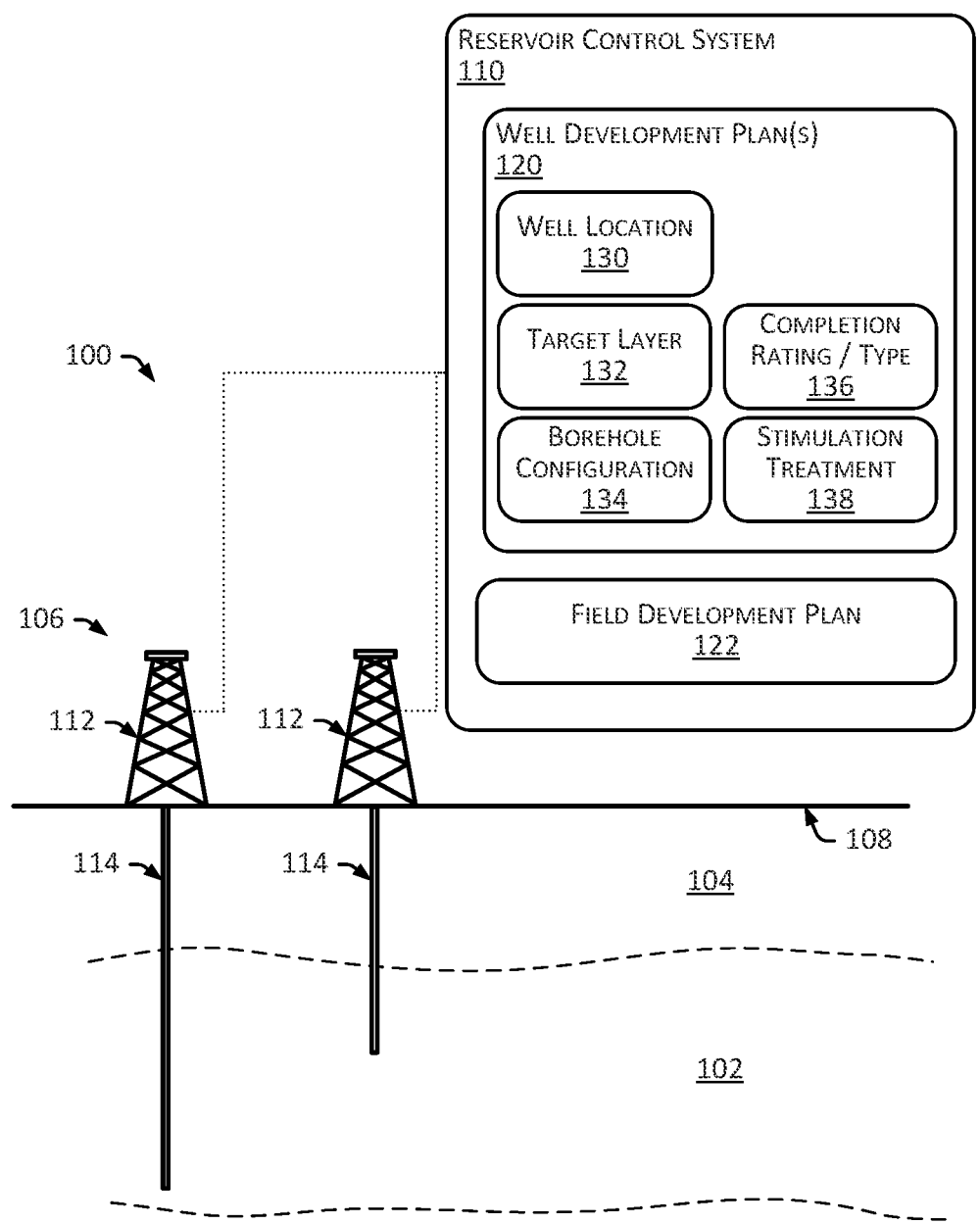
FIG. 1 is diagram that illustrates a hydrocarbon reservoir environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are systems and methods for hydrocarbon reservoir development, including gas field planning and development. In some embodiments, proposed well locations for a multi-layer gas reservoir are identified and assessed to generate a corresponding gas field development plan that can be used as a basis for developing the multi-layer gas reservoir. For example, embodiments may include the following: (1) identifying proposed well locations located within a reservoir boundary; and (2) for each proposed well location, developing a well plan according to the following: (a) identifying layers of the multi-layer gas reservoir that are located below the proposed well location; (b) iteratively assessing the layers from deepest to shallowest to identify a deepest "suitable" layer that is not dry, congested, or unsuitable for gas production (a "target layer"); and (c) performing the following for the target layer and the proposed well location: (i) determining a borehole configuration for the proposed well location (e.g., based on reservoir pressure, reservoir quality and borehole spacing requirements associated with the proposed well location, and the borehole configuration determined being a horizontal wellbore configuration, a deviated wellbore configuration, or a vertical wellbore configuration); (ii) determining a completion type for the proposed well location (e.g., based on the borehole configuration for the proposed well location, a formation breakdown pressure associated with the proposed well location and type of rock associated with the proposed well location, and the completion type determined being a high-pressure lined completion, a low pressure lined completion, a high-pressure open-holed completion, or a low-pressure open-holed completion); (ii) determining a stimulation treatment for the proposed well location (e.g., based on the borehole configuration and the completion type for the proposed well location, and the stimulation treatment determined being a proppant fracture stimulation treatment, an acid/matrix stimulation treatment, or an acid/fracture stimulation treatment), where a well plan for the proposed well location is generated that specifies some or all of a well location, the target layer, a borehole configuration, a completion type, and a stimulation treatment that corresponds to the respective ones determined for the proposed well location. In some embodiments, a gas field development plan is determined based on well plans for the proposed well locations. A gas field development plan may, for example, specify, for each of one or more proposed well locations, some or all of the well location, the target layer, the borehole configuration, the completion type, and the stimulation treatment specified by the gas well plan for the associated proposed well location. In some embodiments, the multi-layer gas reservoir is developed based on the gas field development plan. This may include, for example, forming (e.g., drilling or completing), for one or more of the proposed well locations, a gas well extending into the multi-layer gas reservoir, with each of the gas wells being formed in accordance with some or all of the well location, the target layer, the borehole configuration, the completion type, and the stimulation treatment specified by the field plan for the associated proposed well location.

FIG. 1 is a diagram that illustrates a hydrocarbon reservoir environment ("reservoir environment") 100 in accordance with one or more embodiments. In the illustrated embodiment, the reservoir environment 100 includes a hydrocarbon reservoir ("reservoir") 102 located in a subsurface formation ("formation") 104, and a hydrocarbon reservoir development system 106.

The formation 104 may include a porous or fractured rock formation that resides underground, beneath the Earth's surface ("surface") 108. The reservoir 102 may include a portion of the formation 104 that contains (or that is determined to contain) a subsurface pool of hydrocarbons, such as gas or oil. The formation 104 and the reservoir 102 may each include different layers of rock having varying characteristics (e.g., varying degrees of permeability, porosity, water saturation or oil saturation). The hydrocarbon reservoir development system 106 may facilitate the extraction (or "production") of hydrocarbons from the reservoir 102. In some embodiments, the reservoir 102 is a gas reservoir.

In some embodiments, the hydrocarbon reservoir development system 106 includes a hydrocarbon reservoir control system ("control system") 110 and one or more wells 112. In some embodiments, the control system 110 includes a computer system that is the same as or similar to that of computer system 1000 described with regard to at least FIG. 5. Each of the wells 112 may include a wellbore 114 that extends from the surface 108 into a target zone of the formation 104, such as the reservoir 102. The wellbore 114 may be created, for example, by a drill bit boring along a path (or "trajectory") through the formation 104 and the reservoir 102. In some embodiments, the reservoir 102 is a gas reservoir, and the wells 112 are gas wells operable to extract gas from the reservoir 102.

In some embodiments, the control system 110 controls development of the reservoir 102. For example, the control system 110 may conduct processing for determining well development plans (or "well plans") 120 for the wells 112 or for determining a field development plan (FDP) 122 for the reservoir 102, or control drilling, completion or operating of the wells 112 in accordance with the well development plans 120 or the field development plan 122.

Figure 2A:
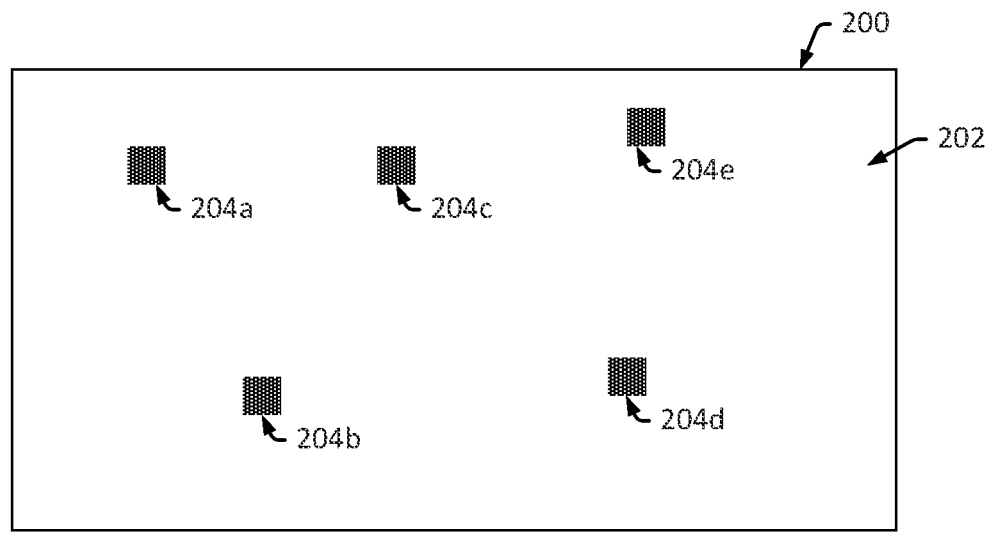
FIGS. 2A-2B are diagrams that illustrate a hydrocarbon reservoir in accordance with one or more embodiments.
Figure 2B:
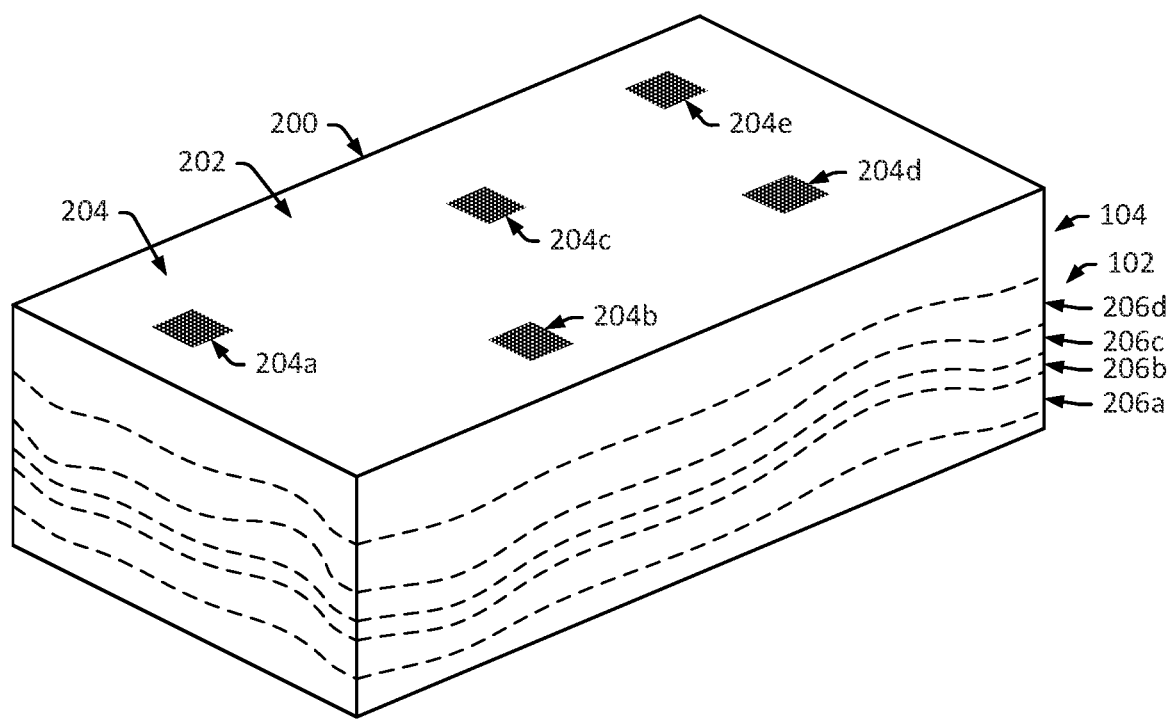

FIGS. 2A-2B are diagrams that illustrate top and perspective views, respectively, of an example hydrocarbon reservoir 102 in accordance with one or more embodiments. In the illustrated embodiment, a rectangular reservoir boundary 200 defines the extent of a field 202 having five proposed well locations 204 (e.g., proposed well locations 204a-204e) located therein. Referring to FIG. 2B, the hydrocarbon reservoir 102 is a multi-layer reservoir defined by four horizontally oriented subsurface layers 206 (e.g., reservoir layers 206a-206d), with reservoir layer 206a being the deepest layer (or "bottom layer") of the reservoir layers 206, reservoir layer 206b being the next shallowest reservoir layer to reservoir layer 206a, reservoir layer 206c being the next shallowest reservoir layer to reservoir layer 206b, and reservoir layer 206d being the next shallowest reservoir layer to reservoir layer 206c and the shallowest layer (or "top layer") of the reservoir layers 206. It will be appreciated that this is an example for the purpose of explanation, and a reservoir may have different shapes, different numbers of layers, or different layer orientations, a reservoir-boundary may have different shapes, and a field may have different numbers of proposed well locations.

In some embodiments, proposed well locations for a multi-layer gas reservoir are identified and assessed to generate a corresponding gas field development plan that is used as a basis for developing the multi-layer gas reservoir. For example, embodiments may include the following: (1) identifying the proposed well locations 204 located within the reservoir boundary 200; and (2) for each of the proposed well locations 204, developing a well plan 120 according to the following: (a) identifying layers 206 of the multi-layer gas reservoir 102 that are located below the proposed well location 204; (b) iteratively assessing the layers 206 from deepest to shallowest (e.g., starting with layer 206a) to identify a deepest "suitable" layer (e.g., the deepest of layers 206 that is not dry, congested, or unsuitable for gas production); and (c) for the deepest suitable layer identified, performing the following for the proposed well location 204: (i) determining a borehole configuration for the proposed well location 204 (e.g., based on reservoir pressure, reservoir quality, and borehole spacing requirements associated with the proposed well location 204, and the borehole configuration determined being a horizontal wellbore configuration, a deviated wellbore configuration, or a vertical wellbore configuration); (ii) determining a completion type for the proposed well location 204 (e.g., based on the borehole configuration for the proposed well location 204, a formation breakdown pressure associated with the proposed well location 204 and type of rock associated with the proposed well location 204, and the completion type determined being a high-pressure lined completion, a low pressure lined completion, a high-pressure open-holed completion, or a low-pressure open-holed completion); (ii) determining a stimulation treatment for the proposed well location 204 (e.g., based on the borehole configuration and the completion type for the proposed well location 204, and the stimulation treatment determined being a proppant fracture stimulation treatment, an acid/matrix stimulation treatment, or an acid/fracture stimulation treatment). A high pressure completion may include a pressure rating of above about 13,000 pound per square inch (psi) (e.g., 15,000 psi). A low pressure completion may include a pressure rating of below about 13,000 psi (e.g., 10,000 psi).

A well plan 120 for the proposed well location 204 is generated that specifies a well location 130 (e.g., that corresponds to the proposed well location 204, a target layer 132 (e.g., that corresponds to the suitable (or "target") layer determined for the associated proposed well location 204), a borehole configuration 134 (e.g., that corresponds to the borehole configuration determined for the associated proposed well location 204), a completion type 136 (e.g., that corresponds to the completion type determined for the associated proposed well location 204), or a stimulation treatment 138 (e.g., that corresponds to the stimulation treatment determined for the associated proposed well location).

In some embodiments, a gas field development plan 122 is determined based on well plans for the proposed well locations. A gas field development plan 122 may, for example, specify, for each of one or more of the proposed well locations 204, the well location 130, the target layer 132, the borehole configuration 134, the completion type 136, or the stimulation treatment 138 specified by the gas well plan 120 for the proposed well location 204.

In some embodiments, the multi-layer gas reservoir 102 is developed based on the gas field development plan 122. This may include, for example, forming (e.g., drilling or completing), for one or more of the proposed well locations 204 of the gas field development plan 122, a gas well 112 extending into the multi-layer gas reservoir 102, with each of the gas wells 112 being formed in accordance with some or all of the well location 130, the target layer 132, the borehole configuration 134, the completion type 136, and the stimulation treatment specified by the gas field development plan 122 (or the corresponding well plan 120) for the proposed well location 204.

Figure 3:
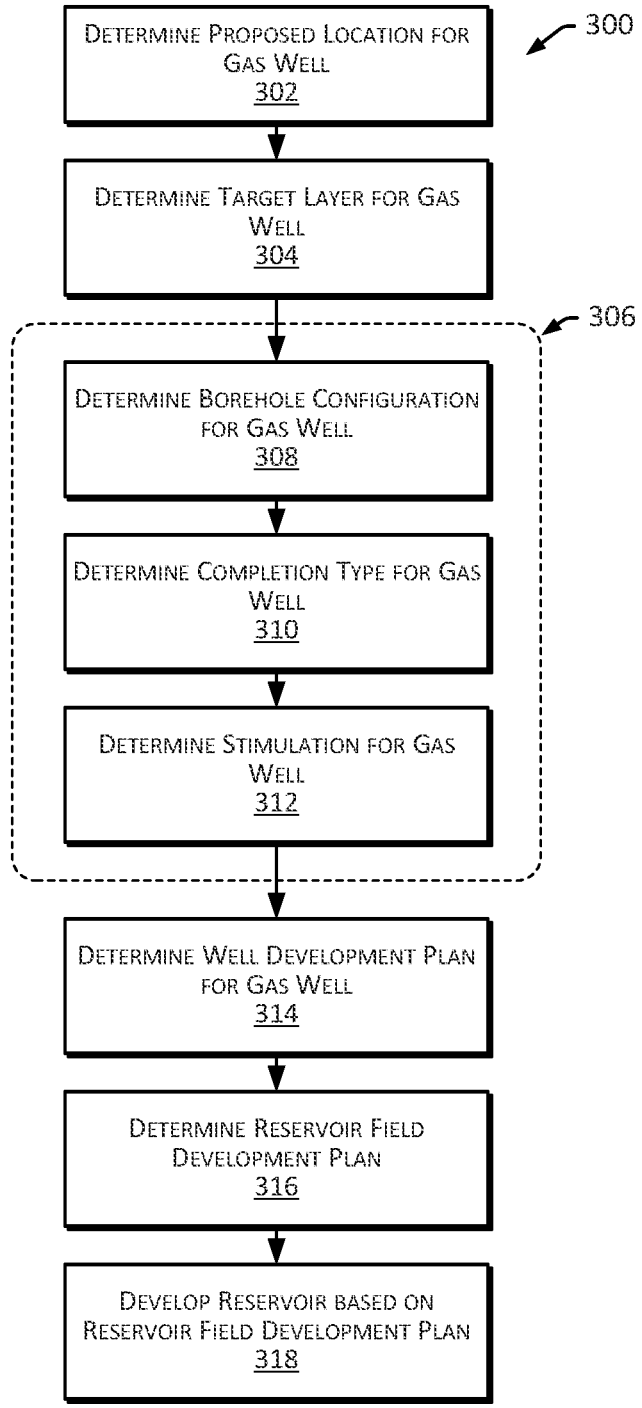
FIG. 3 is a flowchart that illustrates a method of developing a hydrocarbon reservoir in accordance with one or more embodiments.
Figure 4A:
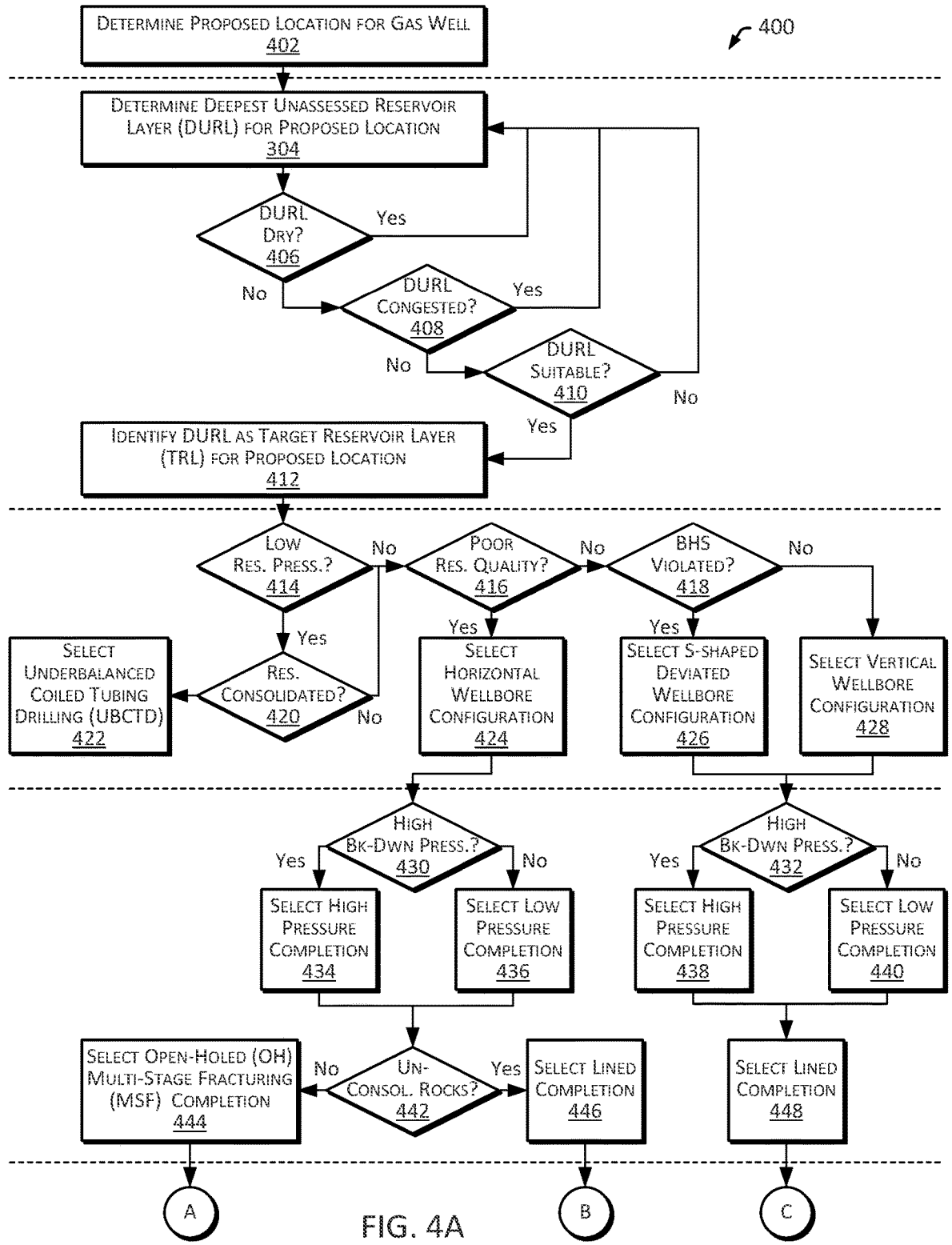
FIGS. 4A and 4B are flowcharts that illustrate aspects of determining characteristics of a gas well in accordance with one or more embodiments.
Figure 4B:
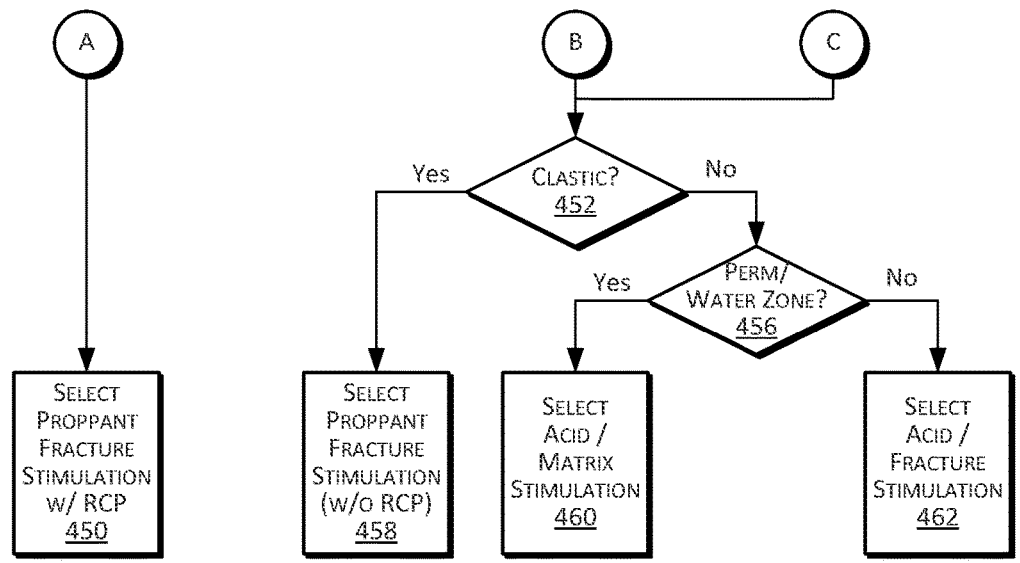

FIG. 3 is a flowchart that illustrates a method of developing a hydrocarbon reservoir in accordance with one or more embodiments. Some or all of the procedural elements of method 300 may be performed, for example, by the control system 110 (or another operator). FIGS. 4A and 4B is a flowchart that illustrates aspects of the method relating to determining characteristics of a gas well in accordance with one or more embodiments. Some or all of the procedural elements of method 300 or 400 may be performed, for example, by the control system 110 (or another operator).

Method 300 may include determining a proposed location for a gas well (block 302), determining a target layer for the gas well (block 304), determining characteristics of the gas well (block 306) (e.g., including determining a borehole configuration for the proposed gas well (block 308), determining a completion for the proposed gas well (block 310), and determining a stimulation treatment for the proposed gas well (block 312)), determining a gas well development plan for the proposed gas well (block 314), determining a reservoir field development plan (block 316), or developing the reservoir based on the reservoir field development plan (block 318).

In some embodiments, determining a proposed location for a gas well (block 302) includes determining, by the control system 110 (or another operator), a proposed location with a reservoir boundary (e.g., as described with regard to at least blocks 402 of method 400).

In some embodiments, determining a target layer for the gas well (block 304) includes determining, by the control system 110 or another reservoir operator, a target layer that is a deepest suitable layer of a gas reservoir that is associated with the proposed location (e.g., as described with regard to at least blocks 404-410 of method 400). This may include an iterative assessment of layers from deep to shallow to determine a deepest suitable reservoir layer for development (e.g., a target reservoir layer that is not dry, not congested, and not unsuitable for gas production).

In some embodiments, determining characteristics of the gas well (block 306) includes determining, by the control system 110 (or another operator), characteristics for a well at the proposed location and having a wellbore extending into the target layer (e.g., as described with regard to at least blocks 414-464 of method 400).

In some embodiments, determining a borehole configuration for the gas well (block 308) includes determining, by the control system 110 (or another operator), a borehole configuration for the gas well based on reservoir characteristics at the proposed well location, such as reservoir pressure, reservoir quality, and borehole spacing requirements associated with the proposed well location. (e.g., as described with regard to at least blocks 414-428 of method 400). The borehole configuration determined may be, for example, a horizontal wellbore configuration, a deviated wellbore configuration, or a vertical wellbore configuration.

In some embodiments, determining a completion type for the gas well (block 310) includes determining, by the control system 110 (or another operator), a completion type for the proposed well location based on the borehole configuration for the proposed well location and other reservoir characteristics, such as a formation breakdown pressure associated with the proposed well location and type of rock associated with the proposed well location (e.g., as described with regard to at least blocks 430-448 of method 400). The completion type determined may be, for example, a high-pressure lined completion, a low pressure lined completion, a high-pressure open-holed completion, or a low-pressure open-holed completion.

In some embodiments, determining a stimulation treatment for the proposed gas well (block 312) includes determining by the control system 110 (or another operator), a stimulation treatment for the proposed well location based on the borehole configuration and the completion type for the proposed well location, and other reservoir characteristics, such as type of rock, permeability and proximity to water associated with the proposed well location (e.g., as described with regard to at least blocks 450-462 of method 400). The stimulation treatment determined may be, for example, a proppant fracture stimulation treatment, an acid/matrix (or "matrix acidizing") stimulation treatment, or an acid/fracture (or "acid fracturing") stimulation treatment.

In some embodiments, determining a well development plan for the proposed gas well (block 314) includes determining by the control system 110 (or another operator), a well plan 120 for the proposed well location that specifies the target layer, the borehole configuration, the completion type, and the stimulation treatment determined for the proposed well location. Method steps 302-314 may be performed for each of one or more proposed well locations within a reservoir boundary of a reservoir to determine well plans for multiple gas wells within a reservoir boundary. For example, method steps 302-314 may be performed for each of proposed well locations 204a-204e within reservoir boundary 200 to generate five respective well plans 120 (e.g., each specifying the target layer, the borehole configuration, the completion type, and the stimulation treatment determined for the associated proposed well location).

In some embodiments, determining a reservoir development plan (block 316) includes determining, by the control system 110 (or another operator), based on the well plans for the proposed well locations, a gas field development plan, the gas field development plan specifying, for each of one or more of the proposed well locations, some or all of the aspects of the gas well plan determined for the proposed well location. For example, a reservoir field development plan 122 for the reservoir 102 may include some or all of the five well plans 120 generated for the proposed well locations 204a-204e.

In some embodiments, developing the reservoir based on the reservoir field development plan (block 318) includes developing, by the control system 110 (or another operator), the reservoir in accordance with some or all of the proposed well locations and characteristics (e.g., including borehole configuration, completion type, and stimulation treatment) specified in the field development plan. For example, developing the reservoir 102 based on the reservoir field development plan 122 may include the control system 110 (or another operator) scheduling well drilling and completion operations based on the proposed well locations and characteristics specified in the field development plan, ordering materials for the scheduled well drilling and completion operations, or conducting (e.g., the control system 110 (or another operator) controlling or otherwise directing) well drilling and completions operations in accordance with the proposed well locations and characteristics specified in the field development plan 122. Where, for example, a field development plan 122 specifies target reservoir layer 206b, a horizontal wellbore configuration, a low pressure lined completion, and a proppant fracture stimulation treatment, developing the reservoir 102 based on the reservoir field development plan 122 may include the control system 110 (or another operator) scheduling corresponding horizontal well drilling operations, a corresponding low pressure lining operation, and a corresponding proppant fracture stimulation treatment to be completed at the proposed well location 204a, ordering materials for the scheduled well drilling and completion operations, and conducting the horizontal well drilling operation (e.g., to reach the target reservoir layer 206b), the low pressure lining operation, and the proppant fracture stimulation treatment at the proposed well location 204a. Well plans 120 for some or all of the other proposed well locations 204b-204e may be implemented in a similar manner to further develop the reservoir 102.

Referring to FIG. 4A, in some embodiments, method 400 includes determining a proposed location for a gas well (block 402). This may include determining a proposed location for a gas well within a reservoir boundary of a reservoir. For example, determining a proposed location for a gas well may include the control system 110 (or another reservoir operator) identifying the proposed well location 204a located within the reservoir boundary 200 associated with the reservoir 102.

In some embodiments, method 400 includes determining a deepest unassessed reservoir layer for the proposed location (block 403). This may include determining layers of a gas reservoir that are located below the proposed well location, and determining a deepest of the layers that has not yet been assessed with regard to being a suitable/target layer. For example, determining a deepest unassessed reservoir layer for the proposed location may include the control system 110 (or another reservoir operator), in a first iteration of assessment of the layers of the well location 204a, identifying the four reservoir layers 206a-206d located directly below the well location 204a, and determining that reservoir layer 206a is the deepest of the unassessed reservoir layers 206, and proceeding to assessment of layer 206a with regard to being a target layer (e.g., blocks 406-410). Method 400 may include, in response to determining that a reservoir layer is not dry (block 406), is not congested (block 408), and is suitable for development (block 410), identifying the layer as a target reservoir layer for the proposed location (block 412). For example, in response to determining that reservoir layer 206a is not dry, is not congested, and is suitable for development (in the first iteration of assessment of the layers associated with the well location 204a), method 400 may proceed to identify reservoir layer 206a as a target reservoir layer for the well location 204a. In contrast, in response to determining that reservoir layer 206a is dry, congested, or is not suitable for development (in the first iteration of assessment of the layers associated with the well location 204a), method 400 may proceed to a second iteration of assessment of the layers associated with the well location 204a that includes determining the reservoir layer 206b to be the deepest unassessed reservoir layer 206 (block 404) and proceeding to assessment of layer 206b with regard to being a target layer (e.g., blocks 406-410). This iterative process may proceed through the four reservoir layers 206a-206d until a target layer is identified, or all of the layers have been assessed (and deemed unsuitable for being a target layer).

In some embodiments, a reservoir layer is determined to be dry if it devoid of producible hydrocarbons. Such a determination may include determining that the reservoir layer does not have a potential to produce hydrocarbons (e.g., a determination that no hydrocarbons are present in the reservoir layer or that any hydrocarbons present in the reservoir layer are not capable of being produced at a quantity sufficient to justify production (or "commercial quantities")). For example, a reservoir layer may be determined to be dry if it is determined that the layer has less than a threshold potential gas production rate (e.g., a potential of less than 100,000,000 cubic feet of gas per day from the layer).

In some embodiments, a reservoir layer is determined to be congested if it has no drainage area left to drain the reserve volume of this layer. Such a determination may include determining that a reservoir layer is congested if the target well violates a well-to-well spacing requirement, which is intended to prevent drainage overlapping and fluid communication between wells. For example, a reservoir layer may be determined to be congested if it is determined that a wellbore of a well in the layer is less than a threshold distance (e.g., less than 500 meters) from a wellbore of another well in the layer.

In some embodiments, a reservoir layer is determined to be suitable if it can produce a suitable volume of hydrocarbons in relation to its drainage area. Such a determination may include determining that a reservoir layer is suitable if a ratio of volume of hydrocarbons present to the size of the drainage area is above a volume to drainage area threshold ratio. For example, a reservoir layer may be determined to be suitable if a volume to drainage area threshold ratio is greater than 300,000 cubic-feet/acre.

In some embodiments, method 400 includes, in response to identifying a target reservoir location for a proposed well location, determining whether the portion of the reservoir located between the proposed location of the well and the target reservoir layer has relatively low reservoir pressure (block 414), is of relatively poor quality (block 416), is consolidated (block 420), or whether bottom hole spacing requirements have been violated (block 418). In response to determining relatively low reservoir pressure and consolidation, method 400 may include determining it appropriate to drill the well with underbalanced coiled tubing type drilling (UBCTD) (block 422). In response to determining a lack of relatively low reservoir pressure or a lack of consolidation and poor reservoir quality, method 400 may include determining a horizontal wellbore configuration (block 424). In response to determining a lack of relatively low reservoir pressure (or a lack of consolidation), lack of poor reservoir quality, and a bottom hole spacing violation, method 400 may include determining an S-shaped deviated wellbore configuration (block 426). In response to determining a lack of relatively low reservoir pressure (or a lack of consolidation), lack of poor reservoir quality, and no bottom hole spacing violation, method 400 may include determining a vertical wellbore configuration (block 428). For example, where the reservoir layer 206b is identified as the target reservoir layer for the first proposed well location 204a, and it is determined that the portion of the reservoir located between the proposed location of the well and the reservoir layer 206b lack relatively low reservoir pressure (e.g., it has a relatively high reservoir pressure), and of poor quality, a horizontal wellbore configuration may be determined for a well to be located at the first proposed well location 204a.

In some embodiments, a portion of a reservoir is determined to be of low pressure if it has a relatively low reservoir pressure. This may be due to hydrocarbon depletion/production for a period of time. Such a determination may include determining that that a corresponding reservoir pressure is below a corresponding reservoir pressure threshold (e.g., below a reservoir pressure threshold of 3000 pounds-per-square-inch (psi)).

In some embodiments, a portion of a reservoir is determined to be of poor quality if it has a relatively low deliverability. Such a determination may include determining that a corresponding product of reservoir expected permeability and net pay thickness value (kh) is below a deliverability threshold (e.g., below a deliverability threshold of 50 millidarcy*meters).

In some embodiments, a portion of a reservoir is determined to be consolidated if the reservoir rock grains of the portion have strong adherence bond such that the portion does not have a tendency of producing solids. Such a determination may include determining that the expected solid production rate is below a solid-free rate threshold (e.g., below a solid-free rate threshold of 0.1 pound of solids per 100,000,000 cubic feet of gas).

In some embodiments, method 400 includes, in response to determining a wellbore configuration, determining whether the portion of the reservoir located between the proposed location of the well and the target reservoir layer has relatively high breakdown pressure (block 430 or block 432). In response to determining a relatively high breakdown pressure, method 400 may include determining a high pressure completion (block 434 or 438). In response to determining lack of a relatively high breakdown pressure (e.g., a relatively low break down pressure), method 400 may include determining a low pressure completion (block 436 or 440). In the case of an S-shaped deviated wellbore configuration or a vertical wellbore configuration having been previously identified, method 400 may proceed to determining a lined completion (block 448). In the case of a horizontal wellbore configuration having been previously identified, method 400 may proceed to determining whether the portion of the reservoir located between the proposed location of the well and the target reservoir layer has unconsolidated rock (block 442). In response to determining a lack of unconsolidated rock (e.g., consolidated rock), method 400 may include determining an open-holed (OH) multi-stage fracturing (MSF) completion (block 444). In response to determining presence of unconsolidated rock, method 400 may include determining a lined completion (block 446). Continuing with the above example where the reservoir layer 206b is identified as the target reservoir layer for the first proposed well location 204a and a horizontal wellbore configuration is determined for a well to be located at the first proposed well location 204a, if is further determined that the portion of the reservoir located between the proposed location of the well and the target reservoir layer 206b has relatively high breakdown pressure and unconsolidated rock, method 400 may include determining a high-pressure lined completion for the well to be located at the first proposed well location 204a.

In some embodiments, a portion of a reservoir is determined to have a high breakdown pressure if it has a relatively high formation breakdown pressure (FBP). The formation breakdown pressure may be defined as a pressure that is required to induce fractures to, for example, allow for stimulation fluid to be injected into the formation rock. Such a determination may include determining that a formation breakdown pressure (FBP) for the formation is above a formation breakdown pressure (FBP) threshold (e.g., above a FBP threshold of 16,000 psi).

In some embodiments, a portion of a reservoir is determined to have unconsolidated rock if the reservoir rock grains are loosely arranged such that the grains have weak adherence bond and they have the tendency of producing solids. Such a determination may include determining that the expected solid production rate is above a solid-free rate threshold (e.g., above a solid-free rate threshold of 0.1 pound of solids per 100,000,000 cubic feet of gas).

In some embodiments, method 400 includes, in response to determining a wellbore configuration, determining open-holed (OH) multi-stage fracturing (MSF) completion (block 444) and proceeding to determine proppant fracture stimulation (e.g., with resin-coated proppant (RCP)) (block 450). In some embodiments, method 400 includes, in response to determining a wellbore configuration and a lined completion (at block 446 or 448), proceeding to determine whether the portion of the reservoir located between the proposed location of the well and the target reservoir layer has clastic rock (block 452). In response to determining that the portion of the reservoir located between the proposed location of the well and the target reservoir layer has clastic rock, method 400 may include proceeding to determine proppant fracture stimulation (e.g., without resin-coated proppant (RCP)) (block 458). In response to determining that the portion of the reservoir located between the proposed location of the well and the target reservoir layer does not have clastic rock, method 400 may include proceeding to determine whether the portion of the reservoir located between the proposed location of the well and the target reservoir layer has relatively high permeability or is proximate a zone of water within the formation (block 456). In response to determining that the portion of the reservoir located between the proposed location of the well and the target reservoir layer has relatively high permeability or is proximate a zone of water within the formation, method 400 may include proceeding to select acid/matrix stimulation (block 460). In response to determining that the portion of the reservoir located between the proposed location of the well and the target reservoir layer lacks relatively high permeability or is not proximate a zone of water within the formation, method 400 may include proceeding to select acid/fracture stimulation (block 462). Continuing with the above example where the reservoir layer 206b is identified as the target reservoir layer for the first proposed well location 204a, a horizontal wellbore configuration is determined for a well to be located at the first proposed well location 204a, and a high-pressure lined completion is determined for the well to be located at the first proposed well location 204a, if it is further determined that the portion of the reservoir located between the proposed location of the well and the target reservoir layer has clastic rock, method 400 may include proceeding to determine proppant fracture stimulation (e.g., without resin-coated proppant (RCP)) for the well to be located at the first proposed well location 204*a*. In such an embodiment, a well plan 120 for the well to be located at the first proposed well location 204*a* may be generated that specifies a well location corresponding to the first proposed well location 204*a*, the reservoir layer 206*b* as the target reservoir layer, a horizontal wellbore configuration, a high-pressure lined completion, and proppant fracture stimulation (e.g., without resin-coated proppant (RCP)). A similar assessment may be conducted for some or all of other proposed well locations 204*b-e* to generate respective well plans 120, and the well plans 120 may be used to generate a reservoir field development plan 122 specifying well locations, target layers, borehole configurations, completions, and stimulation treatments corresponding to those of the well plans 120.

In some embodiments, a portion of a reservoir is determined to have clastic rock if the reservoir sediments are made up of pieces of pre-existing rocks. Clastic rocks are usually made of silicate minerals such as sand, silt and clay. Such a determination may include determining that the lithological composition of the reservoir sediments of a corresponding portion of the reservoir is comprised of more than 90% silicate minerals.

In some embodiments, a portion of a reservoir is determined to have relatively high permeability if it has high expected permeability. Such a determination may include determining that that a corresponding reservoir permeability is above a permeability threshold (e.g., above a permeability threshold of 10 millidarcy).

In some embodiments, a portion of a reservoir is determined to be proximate a zone of water if target interval is relatively close to the reservoir water contact. Such a determination may include determining that a portion of a reservoir is proximate a zone of water if it is less than a water zone threshold distance (e.g., less than 150 meters) from a location of reservoir water contact. To prevent water break through and prevent communication with undesirable zone, a small stimulation job may be recommended.

Figure 5:
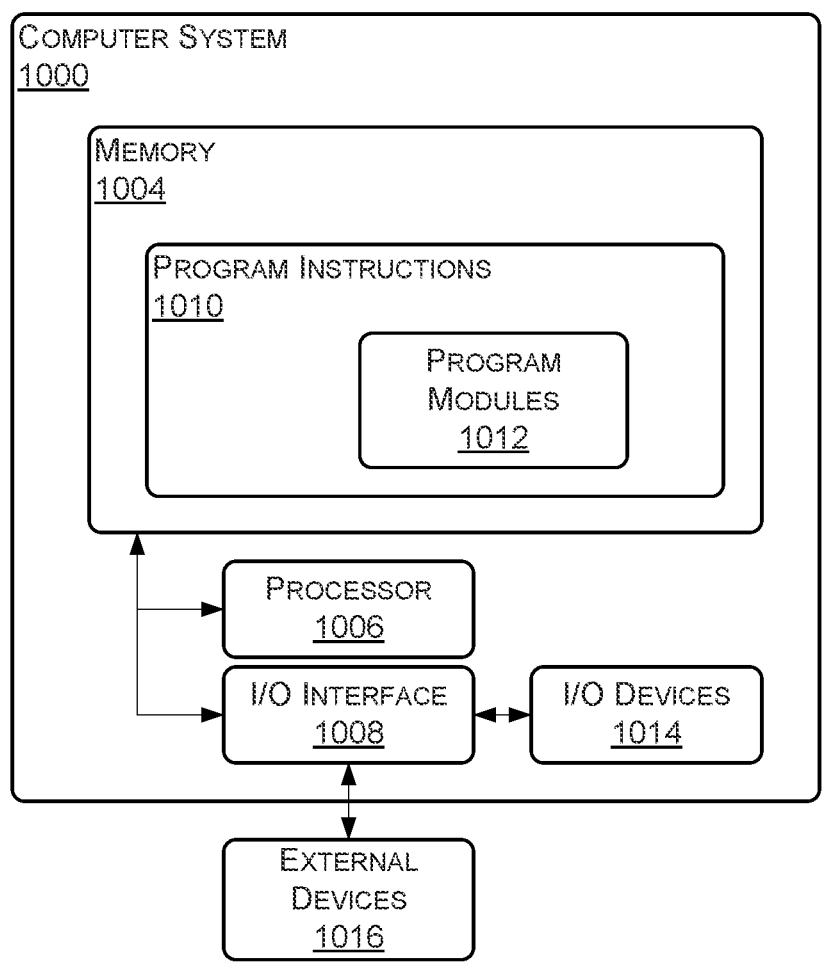
FIG. 5 is a diagram that illustrates an example computer system in accordance with one or more embodiments.

FIG. 5 is a diagram that illustrates an example computer system (or "system") 1000 in accordance with one or more embodiments. The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored on the medium. The program instructions 1010 may include program modules 1012 that are executable by a computer processor (e.g., the processor 1006) to cause the functional operations described, such as those described with regard to the control system 110, or the methods 300 or 400.

The processor 1006 may be any suitable processor capable of executing program instructions. The processor 1006 may include one or more processors that carry out program instructions (e.g., the program instructions of the program modules 1012) to perform the arithmetical, logical, or input/output operations described. The processor 1006 may include multiple processors that can be grouped into one or more processing cores that each include a group of one or more processors that are used for executing the processing described here, such as the independent parallel processing of partitions (or "sectors") by different processing cores to generate the described outputs. The I/O interface 1008 may provide an interface for communication with one or more I/O devices 1014, such as a joystick, a computer mouse, a keyboard, or a display screen (e.g., an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016, such as sensors, valves, pumps, motors, computers or communication networks. In some embodiments, the I/O interface 1008 includes an antenna or a transceiver.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A system for developing a multi-layer gas reservoir, the system comprising:
   a control system comprising a processor and non-transitory computer readable storage medium comprising program instructions stored thereon that are executable by the processor to perform the following operations:
      determining a reservoir boundary defining extents of a field of a multi-layer gas reservoir;
      identifying proposed well locations, each proposed well location of the proposed well locations being defined by a surface location located within the reservoir boundary;
      for each proposed well location of the proposed well locations, determining a well plan comprising the following:
         (a) identifying layers of the multi-layer gas reservoir that are located below the proposed well location;
         (b) identifying a deepest unassessed layer of the layers;
         (c) determining whether the deepest unassessed layer is a dry layer, a congested layer, or unsuitable for gas production, wherein a dry layer comprises a layer devoid of producible hydrocarbons, a congested layer comprises a layer having no drainage area left to drain a reserve volume of the layer, and unsuitable for gas production comprises a layer having a volume to drainage area threshold ratio less than or equal to 300,000 cubic-feet/acre;
         (d) in response to determining that the deepest unassessed layer is a dry layer, a congested layer, or unsuitable for gas production, returning to step (b) wherein a next shallowest layer of the layers is identified as the deepest unassessed layer;
         (e) in response to determining that the deepest unassessed layer is not a dry layer, a congested layer, or unsuitable for gas production, identifying the deepest unassessed layer as a target layer for the proposed well location and performing the following for the proposed well location:
            (i) determining a borehole configuration for the proposed well location based on reservoir pressure, reservoir quality, and borehole spacing requirements associated with the proposed well location, the borehole configuration determined comprising a horizontal wellbore configuration, a deviated wellbore configuration, or a vertical wellbore configuration;
            (ii) determining a completion for the proposed well location based on the borehole configuration for the proposed well location, a formation breakdown pressure associated with the proposed well location and type of rock associated with the proposed well location, the completion determined comprising a high-pressure lined completion, a low pressure lined completion, a high-pressure open-holed completion, or a low-pressure open-holed completion; and
            (iii) determining a stimulation treatment for the proposed well location based on the borehole configuration and the completion for the proposed well location, the stimulation treatment determined comprising a proppant fracture stimulation treatment, an acid/matrix stimulation treatment, or an acid/fracture stimulation treatment,
         the well plan for the proposed well location comprising the borehole configuration, the completion, and the stimulation treatment determined for the proposed well location;
      determining, based on the well plans for the proposed well locations, a gas field development plan, the gas field development plan specifying, for each of one or more of the proposed well locations, a gas well plan for a proposed gas well at a well location that corresponds to the proposed well location, the gas well plan specifying the target layer, the borehole configuration, the completion, and the stimulation treatment determined for the associated proposed well location; and
      developing the multi-layer gas reservoir based on the gas field development plan, wherein developing the multi-layer gas reservoir based on the gas field development plan comprises forming one or more gas wells in the multi-layer gas reservoir, wherein each of the gas wells formed is formed in accordance with a well location, a target layer, a borehole configuration, a completion, and a stimulation treatment specified by a corresponding well plan of the gas field development plan.

2. The system of claim 1, wherein determining a borehole configuration for a proposed well location comprises:
   determining a horizontal wellbore configuration for the proposed well location in response to determining that a reservoir pressure associated with the proposed well location is not low and a reservoir quality associated with the proposed well location is poor;
   determining a deviated wellbore configuration for the proposed well location in response to determining that a reservoir pressure associated with the proposed well location is not low, a reservoir quality associated with the proposed well location is poor, and borehole spacing is violated by the proposed well location; or
   determining a vertical wellbore configuration for the proposed well location in response to determining that the reservoir pressure associated with the proposed well location is not low, the reservoir quality associated with the proposed well location is poor, and borehole spacing is not violated by the proposed well location.

3. The system of claim 1, wherein determining a completion for a proposed well location comprises:
- determining a high-pressure completion in response to determining that the formation breakdown pressure associated with the proposed well location is high;
- determining a low-pressure completion in response to determining that the formation breakdown pressure associated with the proposed well location is low;
- determining a lined completion in response to:
  - determining a deviated or vertical wellbore configuration for the proposed well location; or
  - determining a horizontal wellbore configuration for the proposed well location and determining that an unconsolidated rock type is associated with the proposed well location; or
- determining an open-holed completion in response to:
  - determining a horizontal wellbore configuration for the proposed well location, and determining that an unconsolidated rock type is not associated with the proposed well location.

4. The system of claim 1, wherein determining a stimulation treatment for a proposed well location comprises:
- determining a proppant fracture stimulation treatment in response to determining an open-holed completion for the proposed well location;
- determining a proppant fracture stimulation treatment in response to determining a lined completion for the proposed well location and determining that the proposed well location is associated with a clastic rock type;
- determining an acid/matrix stimulation treatment in response to determining a lined completion for the proposed well location, determining that the proposed well location is not associated with a clastic rock type, and determining that the proposed well location is associated with permeable rock or proximate a water zone; or
- determining an acid/fracture stimulation treatment in response to determining a lined completion for the proposed well location, determining that the proposed well location is not associated with a clastic rock type, and determining that the proposed well location is not associated with permeable rock or is proximate a water zone.

5. A method for developing a multi-layer gas reservoir, the method comprising:
- determining a reservoir boundary defining extents of a field of a multi-layer gas reservoir;
- identifying proposed well locations, each proposed well location of the proposed well locations being defined by a surface location located within the reservoir boundary;
- for each proposed well location of the proposed well locations, determining a well plan comprising the following:
  - (a) identifying layers of the multi-layer gas reservoir that are located below the proposed well location;
  - (b) identifying a deepest unassessed layer of the layers;
  - (c) determining that the deepest unassessed layer is not a dry layer, a congested layer, or unsuitable for gas production, wherein a dry layer comprises a layer devoid of producible hydrocarbons, a congested layer comprises a layer having no drainage area left to drain a reserve volume of the layer, and unsuitable for gas production comprises a layer having a volume to drainage area threshold ratio less than or equal to 300,000 cubic-feet/acre;
  - (d) in response to determining that the deepest unassessed layer is not a dry layer, a congested layer, or unsuitable for gas production, identifying the deepest unassessed layer as a target layer for the proposed well location and performing the following for the proposed well location:
    - (i) determining a borehole configuration for the proposed well location based on reservoir pressure, reservoir quality, and borehole spacing requirements associated with the proposed well location, the borehole configuration determined comprising a horizontal wellbore configuration, a deviated wellbore configuration, or a vertical wellbore configuration;
    - (ii) determining a completion for the proposed well location based on the borehole configuration for the proposed well location, a formation breakdown pressure associated with the proposed well location and type of rock associated with the proposed well location, the completion determined comprising a high-pressure lined completion, a low pressure lined completion, a high-pressure open-holed completion, or a low-pressure open-holed completion; and
    - (iii) determining a stimulation treatment for the proposed well location based on the borehole configuration and the completion for the proposed well location, the stimulation treatment determined comprising a proppant fracture stimulation treatment, an acid/matrix stimulation treatment, or an acid/fracture stimulation treatment,
  - the well plan for the proposed well location comprising the borehole configuration, the completion, and the stimulation treatment determined for the proposed well location;
- determining, based on the well plans for the proposed well locations, a gas field development plan, the gas field development plan specifying, for each of one or more of the proposed well locations, a gas well plan for a proposed gas well at a well location that corresponds to the proposed well location, the gas well plan specifying the target layer, the borehole configuration, the completion, and the stimulation treatment determined for the associated proposed well location; and
- developing the multi-layer gas reservoir based on the gas field development plan, wherein developing the multi-layer gas reservoir based on the gas field development plan comprises forming one or more gas wells in the multi-layer gas reservoir, wherein each of the gas wells formed is formed in accordance with a well location, a target layer, a borehole configuration, a completion, and a stimulation treatment specified by a corresponding well plan of the gas field development plan.

6. The method of claim 5, wherein determining a borehole configuration for a proposed well location comprises:
- determining a horizontal wellbore configuration for the proposed well location in response to determining that a reservoir pressure associated with the proposed well location is not low and a reservoir quality associated with the proposed well location is poor;
- determining a deviated wellbore configuration for the proposed well location in response to determining that a reservoir pressure associated with the proposed well location is not low, a reservoir quality associated with the proposed well location is poor, and borehole spacing is violated by the proposed well location; or determining a vertical wellbore configuration for the proposed well location in response to determining that the reservoir pressure associated with the proposed well location is not low, the reservoir quality associated with the proposed well location is poor, and borehole spacing is not violated by the proposed well location.

7. The method of claim 5, wherein determining a completion for a proposed well location comprises:
determining a high-pressure completion in response to determining that the formation breakdown pressure associated with the proposed well location is high;
determining a low-pressure completion in response determining that the formation breakdown pressure associated with the proposed well location is low;
determining a lined completion in response to:
determining a deviated or vertical wellbore configuration for the proposed well location; or
determining a horizontal wellbore configuration for the proposed well location and determining that an unconsolidated rock type is associated with the proposed well location; or
determining an open-holed completion in response to:
determining a horizontal wellbore configuration for the proposed well location, and determining that an unconsolidated rock is not associated with the proposed well location.

8. The method of claim 5, wherein determining a stimulation treatment for a proposed well location comprises:
determining a proppant fracture stimulation treatment in response to determining an open-holed completion for the proposed well location;
determining a proppant fracture stimulation treatment in response to determining a lined completion for the proposed well location and determining that the proposed well location is associated with a clastic rock type;
determining an acid/matrix stimulation treatment in response to determining a lined completion for the proposed well location, determining that the proposed well location is not associated with a clastic rock type, and determining that the proposed well location is associated with permeable rock or proximate a water zone; or
determining an acid/fracture stimulation treatment in response to determining a lined completion for the proposed well location, determining that the proposed well location is not associated with a clastic rock type, and determining that the proposed well location is not associated with permeable rock or is proximate a water zone.

9. The method of claim 5, further comprising:
identifying a first deepest unassessed layer of the layers that is deeper than the deepest unassessed layer identified at step (b);
determining that the first deepest unassessed layer is a dry layer, a congested layer, or unsuitable for gas production;
wherein the deepest unassessed layer of the layers is identified at step (b) in response to determining that the first deepest unassessed layer is a dry layer, a congested layer, or unsuitable for gas production.

10. A non-transitory computer readable storage medium comprising program instructions stored thereon that are executable by a processor to perform the following operations for developing a multi-layer gas reservoir:
determining a reservoir boundary defining extents of a field of a multi-layer gas reservoir;
identifying proposed well locations, each proposed well location of the proposed well locations being defined by a surface location located within the reservoir boundary;
for each proposed well location of the proposed well locations, determining a well plan comprising the following:
(a) identifying layers of the multi-layer gas reservoir that are located below the proposed well location;
(b) identifying a deepest unassessed layer of the layers;
(c) determining whether the deepest unassessed layer is a dry layer, a congested layer, or unsuitable for gas production, wherein a dry layer comprises a layer devoid of producible hydrocarbons, a congested layer comprises a layer having no drainage area left to drain a reserve volume of the layer, and unsuitable for gas production comprises a layer having a volume to drainage area threshold ratio less than or equal to 300,000 cubic-feet/acre;
(d) in response to determining that the deepest unassessed layer is a dry layer, a congested layer, or unsuitable for gas production, returning to step (b) wherein a next shallowest layer of the layers is identified as the deepest unassessed layer;
(e) in response to determining that the deepest unassessed layer is not a dry layer, a congested layer, or unsuitable for gas production, identifying the deepest unassessed layer as a target layer for the proposed well location and performing the following for the proposed well location:
(i) determining a borehole configuration for the proposed well location based on reservoir pressure, reservoir quality, and borehole spacing requirements associated with the proposed well location, the borehole configuration determined comprising a horizontal wellbore configuration, a deviated wellbore configuration, or a vertical wellbore configuration;
(ii) determining a completion for the proposed well location based on the borehole configuration for the proposed well location, a formation breakdown pressure associated with the proposed well location and type of rock associated with the proposed well location, the completion determined comprising a high-pressure lined completion, a low pressure lined completion, a high-pressure open-holed completion, or a low-pressure open-holed completion; and
(iii) determining a stimulation treatment for the proposed well location based on the borehole configuration and the completion for the proposed well location, the stimulation treatment determined comprising a proppant fracture stimulation treatment, an acid/matrix stimulation treatment, or an acid/fracture stimulation treatment,
the well plan for the proposed well location comprising the borehole configuration, the completion, and the stimulation treatment determined for the proposed well location;
determining, based on the well plans for the proposed well locations, a gas field development plan, the gas field development plan specifying, for each of one or more of the proposed well locations, a gas well plan for a proposed gas well at a well location that corresponds to the proposed well location, the gas well plan specifying the target layer, the borehole configuration, the completion, and the stimulation treatment determined for the associated proposed well location; and developing the multi-layer gas reservoir based on the gas field development plan, wherein developing the multi-layer gas reservoir based on the gas field development plan comprises controlling forming one or more gas wells in the multi-layer gas reservoir, wherein each of the gas wells formed is formed in accordance with a well location, a target layer, a borehole configuration, a completion, and a stimulation treatment specified by a corresponding well plan of the gas field development plan.

11. The medium of claim 10, wherein determining a borehole configuration for a proposed well location comprises:
   determining a horizontal wellbore configuration for the proposed well location in response to determining that a reservoir pressure associated with the proposed well location is not low and a reservoir quality associated with the proposed well location is poor;
   determining a deviated wellbore configuration for the proposed well location in response to determining that a reservoir pressure associated with the proposed well location is not low, a reservoir quality associated with the proposed well location is poor, and borehole spacing is violated by the proposed well location; or
   determining a vertical wellbore configuration for the proposed well location in response to determining that the reservoir pressure associated with the proposed well location is not low, the reservoir quality associated with the proposed well location is poor, and borehole spacing is not violated by the proposed well location.

12. The medium of claim 10, wherein determining a completion for a proposed well location comprises:
   determining a high-pressure completion in response to determining that the formation breakdown pressure associated with the proposed well location is high;
   determining a low-pressure completion in response to determining that the formation breakdown pressure associated with the proposed well location is low;
   determining a lined completion in response to:
      determining a deviated or vertical wellbore configuration for the proposed well location; or
      determining a horizontal wellbore configuration for the proposed well location and determining that an unconsolidated rock type is associated with the proposed well location; or
   determining an open-holed completion in response to:
      determining a horizontal wellbore configuration for the proposed well location, and determining that an unconsolidated rock type is not associated with the proposed well location.

13. The medium of claim 10, wherein determining a stimulation treatment for a proposed well location comprises:
   determining a proppant fracture stimulation treatment in response to determining an open-holed completion for the proposed well location;
   determining a proppant fracture stimulation treatment in response to determining a lined completion for the proposed well location and determining that the proposed well location is associated with a clastic rock type;
   determining an acid/matrix stimulation treatment in response to determining a lined completion for the proposed well location, determining that the proposed well location is not associated with a clastic rock type, and determining that the proposed well location is associated with permeable rock or proximate a water zone; or
   determining an acid/fracture stimulation treatment in response to determining a lined completion for the proposed well location, determining that the proposed well location is not associated with a clastic rock type, and determining that the proposed well location is not associated with permeable rock or is proximate a water zone.

* * * * *